(12) United States Patent
Zhou et al.

(10) Patent No.: US 9,305,203 B2
(45) Date of Patent: Apr. 5, 2016

(54) METHOD FOR REGISTERING FINGERPRINT IMAGE

(71) Applicant: Tsinghua University, Beijing (CN)

(72) Inventors: Jie Zhou, Beijing (CN); Jianjiang Feng, Beijing (CN); Xiao Yang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 76 days.

(21) Appl. No.: 14/374,196

(22) PCT Filed: Dec. 27, 2013

(86) PCT No.: PCT/CN2013/090745
§ 371 (c)(1),
(2) Date: Jul. 23, 2014

(87) PCT Pub. No.: WO2014/101839
PCT Pub. Date: Jul. 3, 2014

(65) Prior Publication Data
US 2015/0036896 A1    Feb. 5, 2015

(30) Foreign Application Priority Data

Dec. 31, 2012  (CN) .......................... 2012 1 0592867

(51) Int. Cl.
*G06K 9/00*    (2006.01)
(52) U.S. Cl.
CPC .......... *G06K 9/00087* (2013.01); *G06K 9/0008* (2013.01); *G06K 9/00067* (2013.01)
(58) Field of Classification Search
CPC .......... G06K 9/00087; G06K 9/00067; G06K 9/0008; G06K 9/036; G06K 9/6857; G06K 9/00892; G06K 9/00006; G06F 21/32
USPC .......................................................... 382/124
See application file for complete search history.

(56) References Cited

U.S. PATENT DOCUMENTS

2003/0039382 A1 *  2/2003  Yau .................... G06K 9/00067
                                                                        382/125
(Continued)

FOREIGN PATENT DOCUMENTS

| CN | 1506903 | * | 6/2004 |
| CN | 1506903 | A | 6/2004 |
| CN | 101079102 | A | 11/2007 |

(Continued)

OTHER PUBLICATIONS

Neil Yager, Adnan Amin; "Coarse Fingerprint Registration Using Orientation Fields"; EURASIP Journal on Applied Signal Processing 2005:13, 2043-2053, 2005 Hindawi Publishing Corporation.*

*Primary Examiner* — Stephen R Koziol
*Assistant Examiner* — Shaghayegh Azima
(74) *Attorney, Agent, or Firm* — Houtteman Law LLC (57) ABSTRACT

A method for registering a fingerprint image is provided. The method comprises steps of: establishing an orientation field template base according to M training fingerprints, wherein M is a positive integer larger than one; receiving a fingerprint image to be registered; obtaining an initial orientation field of the fingerprint image; obtaining an estimated position and an estimated direction of the fingerprint image according to the initial orientation field and the orientation field template base; and registering the fingerprint image according to a preset position, a preset direction, the estimated position and the estimated direction.

9 Claims, 11 Drawing Sheets

(56) References Cited

U.S. PATENT DOCUMENTS

| | | |
|---|---|---|
| 2007/0047785 A1 | 3/2007 | Jang et al. |
| 2008/0049987 A1* | 2/2008 | Champagne ....... G06K 9/00026 382/124 |
| 2010/0226533 A1* | 9/2010 | Bharath ............. G06K 9/00268 382/103 |
| 2010/0232659 A1* | 9/2010 | Rahmes ............. G06K 9/00087 382/125 |

FOREIGN PATENT DOCUMENTS

| | | |
|---|---|---|
| CN | 103077377 A | 5/2013 |
| DE | 10260642 A1 | 12/2007 |

* cited by examiner

METHOD FOR REGISTERING FINGERPRINT IMAGE

CROSS-REFERENCE TO RELATED APPLICATION

This application claims priority to and benefits of Chinese Patent Application Serial No. 201210592867.1, filed with the State Intellectual Property Office of P. R. China on Dec. 31, 2012, the entire content of which is incorporated herein by reference.

FIELD

Embodiments of the present disclosure generally relate to a fingerprint recognition technology field, and more particularly to a method for fingerprint registration.

BACKGROUND

The fingerprint recognition technology has been widely used in variety of fields, including crime investigation, physical and logical access control, time and attendance. The basic task of fingerprint recognition is to determine if two given fingerprints are from the same finger or not. Because different fingerprint images are usually captured in different poses (even if they are from the same finger), the two fingerprints to be compared have to be registered into the same pose. There are two types of methods for unifying the poses of two fingerprints to be compared: pairwise registration and absolute registration. Pairwise registration means that the registration is obtained based on the two given fingerprints. If a given fingerprint has to be compared with N (N can be more than millions in police fingerprint recognition systems) fingerprints in the database, the pairwise registration has to be performed N times and thus it is very inefficient. For absolute registration, only one registration is required for each fingerprint and thus it is very efficient especially for searching a given fingerprint in a large fingerprint database. Here, we consider only absolute registration.

In the related art, the fingerprint is registered according to local characteristics such as a consistency of a gray gradient and a gray variance. The methods in the related art have a good performance when the background of the fingerprint image is clean. However, these methods hardly register the fingerprint when the background of the fingerprint image is complicated. Specifically, when the background of the fingerprint image is complicated, the methods in the related art only can judge whether a local region of the fingerprint image is a fingerprint region (i.e., the region containing the fingerprint), but cannot estimate the central point and the direction of the fingerprint image. Thus, the methods in the related art cannot register the fingerprint image when the central region of the fingerprint is missing.

In order to solve the above problems, the fingerprint region should be manually cut out from the fingerprint image by the fingerprint expert, and the fingerprint should be manually registered to a unified pose (the center of the fingerprint is located in the center of the fingerprint image and the direction of fingerprint is the vertical direction) by the fingerprint expert. Alternatively, a pose estimation algorithm may be combined with the fingerprint matching algorithm to registered fingerprint. However, the process of manually registering the fingerprint by the fingerprint expert is complicated and consumes much time and effort, and the method of registering the fingerprint with the fingerprint matching algorithm is complicated, has a heavy computation, a low matching efficiency and a low matching accuracy.

SUMMARY

Embodiments of the present disclosure seek to solve at least one of the problems existing in the prior art to at least some extent.

One objective of the present disclosure is to provide a method for registering a fingerprint image, which can register the fingerprint image automatically and has a good registration effect, thus improving the fingerprint recognition efficiency.

According to embodiments of the present disclosure, a method for registering a fingerprint image is provided. The method comprises steps of: establishing an orientation field template base according to M training fingerprints, in which M is a positive integer larger than one; receiving a fingerprint image to be registered; obtaining an initial orientation field of the fingerprint image; obtaining an estimated position and an estimated direction of the fingerprint image according to the initial orientation field and the orientation field template base; and registering the fingerprint image according to a preset position, a preset direction, the estimated position and the estimated direction.

In one embodiment of the present disclosure, establishing an orientation field template base according to M training fingerprints comprises: calibrating an orientation field of each of the M training fingerprints, and calibrating a reference point and a reference direction of each of the M training fingerprints according to the orientation field of each of the M training fingerprints; registering the orientation field of each of the M training fingerprints according to the reference point and the reference direction of each of the M training fingerprints and a preset coordinate system to obtain M reference orientation fields of the M training fingerprints; obtaining Na groups of orientation field templates according to the M reference orientation fields, in which Na is a positive integer; clustering each group of orientation field templates to obtain k reference orientation field templates, and calculating a spatial probability distribution of each reference orientation field template relative to the reference point of the each reference orientation field; obtaining a vote distribution of each reference orientation field template according to the spatial probability distribution of the each reference orientation field template; and establishing the orientation field template base according to the Na groups of orientation field templates and the vote distribution of each reference orientation field template.

In one embodiment of the present disclosure, obtaining Na groups of orientation field templates according to the M reference orientation fields comprises: A1: rotating each of the M reference orientation fields counterclockwise from the reference direction and in a step of $n \times (360°/Na)$ to obtain Na reference directions, in which $n \in N_4$; A2: for each reference direction, sliding a window on each reference orientation field from left to right and from top to bottom, in which the window comprises $d \times d$ image blocks, d is a positive integer; A3: judging whether each image block of the window is in a valid region of the reference orientation field when the window slides to each position in each reference orientation field; A4: if yes, recording an orientation field corresponding to the $d \times d$ image blocks as the orientation field template corresponding to the reference direction; and A5: repeating steps A2-A4 until obtaining the Na groups of orientation field templates corresponding to the Na reference directions.

In one embodiment of the present disclosure, each group of the orientation field templates is clustered by a K-medoid clustering method.

In one embodiment of the present disclosure, the vote distribution of each reference orientation field template is obtained by mapping the spatial probability distribution of the each reference orientation field template with the reference point of the corresponding reference orientation field as a center.

In one embodiment of the present disclosure, obtaining an initial orientation field of the fingerprint image comprises: calibrating a foreground region of the fingerprint image; dividing the foreground region into a plurality of foreground blocks non-overlapped with each other; processing each foreground block by a two-dimensional short-time Fourier transform to obtain two orientations having the strongest frequency response for each foreground block; and establishing the initial orientation field of the fingerprint image according to the two orientations having the strongest frequency response for each foreground block. In one embodiment of the present disclosure, obtaining an estimated position and an estimated direction of the fingerprint image comprises: B1: constituting Na vote grids according to a size of the initial orientation field, in which each of the Na vote grids is corresponding to each of the Na reference directions respectively; B2: for each vote grid, obtaining the vote distribution corresponding to each position in the initial orientation field according to the orientation field template base to obtain a plurality of vote distributions, superimposing the plurality of vote distributions to obtain a superimposed vote distribution; B3: repeating step B2 until obtaining Na superimposed vote distributions; B4: obtaining a maximum distribution probability according to the Na superimposed vote distributions, and determining the position corresponding to the maximum distribution probability as the estimated position; and B5: obtaining the vote grid corresponding to the maximum distribution probability, and determining the reference direction corresponding to the maximum distribution probability as the estimated direction.

In one embodiment of the present disclosure, obtaining the vote distribution corresponding to each position in the initial orientation field according to the orientation field template base comprises: sliding a window on the initial orientation field from left to right and from top to bottom, in which the window comprises d×d foreground blocks; obtaining a candidate orientation field consisting of d×d×2 orientations of the d×d foreground blocks when the window slides to each position of the initial orientation field; calculating a similarity between each reference orientation field template of each group of orientation field templates and the candidate orientation field to obtain k×Na similarities; and obtaining the reference orientation field template corresponding to a maximum similarity of the k×Na similarities, and obtaining the vote distribution corresponding to the reference orientation field template having the maximum similarity as the vote distribution corresponding to each position in the initial orientation field.

In one embodiment of the present disclosure, registering the fingerprint image according to a preset position, a preset direction, the estimated position and the estimated direction comprises: estimating a translation vector according to the preset position and the estimated position; estimating a rotation vector according to the preset direction and the estimated direction; and orthogonal transforming the fingerprint image according to the translation vector and the rotation vector.

With the method according to embodiments of the present disclosure, the fingerprint image is registered by using natural characteristics of the fingerprint itself (such as the orientation of the fingerprint ridge and the spatial probability distribution of the orientation) as the prior information, thus reducing the human intervention during the fingerprint registration, reducing the workload of fingerprint experts, and improving the efficiency of fingerprint registration and the automation degree of the fingerprint recognition system.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It is to be understood that phraseology and terminology used herein (such as, terms like "center", "longitudinal", "lateral", "length", "width", "thickness", "up", "down", "front", "rear", "left", "right", "top", "bottom", "inside", "outside", "vertical", "horizontal", "clockwise" and "counterclockwise") are only used to simplify description of the present invention, and do not indicate or imply that the device or element referred to must have or operated in a particular orientation. They cannot be seen as limits to the present disclosure.

It is to be understood that, in the description of the present disclosure, terms of "first" and "second" are only used for description and cannot be seen as indicating or implying relative importance. Unless otherwise stipulated and restricted, it is to be explained that terms of "linkage" and "connection" shall be understood broadly, for example, it could be mechanical connection or electrical connection; it could be direct linkage, indirect linkage via intermediate medium. Those skilled in the art shall understand the concrete notations of the terms mentioned above according to specific circumstances. Furthermore, unless otherwise explained, it is to be understood that a term of "a plurality of" refers to two or more.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

It should be noted that, the orientation field generally includes a pixel orientation field and an image block orientation field. However, in embodiments of the present disclosure, the orientation field refers to the image block orientation fields. In other words, a fingerprint image is divided into a plurality of image blocks having a preset size (such as 16*16 pixels) and non-overlapped with each other, and the orientation of each of the plurality of image blocks can be the orientation including a ridge and a valley. Then, the orientation field of the fingerprint image is formed by the orientations of the plurality of image blocks.

In the following, a method for registering a fingerprint image according to embodiments of the present disclosure will be described in detail with reference to drawings.

Figure 1:
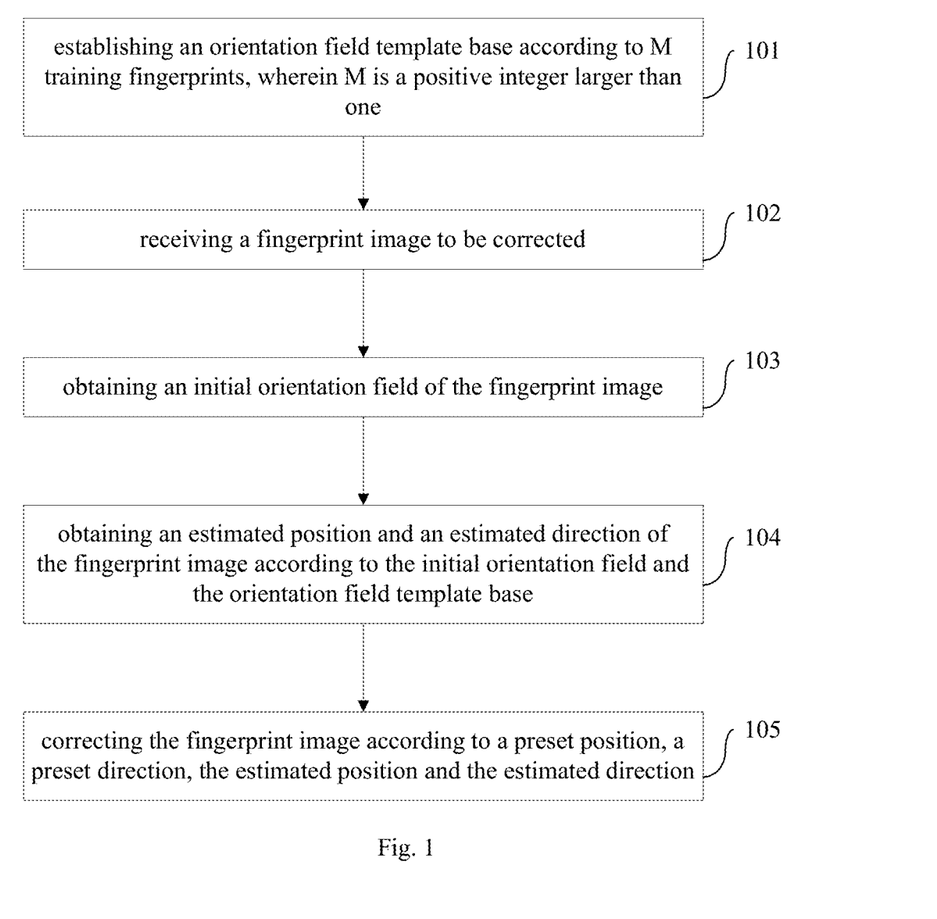
FIG. 1 is a flow chart of a method for registering a fingerprint image according to an embodiment of the present disclosure.

FIG. 1 is a flow chart of a method for registering a fingerprint image according to an embodiment of the present disclosure. As shown in FIG. 1, the method comprises the following steps.

At step 101, an orientation field template base is established according to M training fingerprints, in which M is a positive integer larger than one.

In one embodiment of the present disclosure, the step of establishing the orientation field template base only needs to be performed one time.

Figure 2:
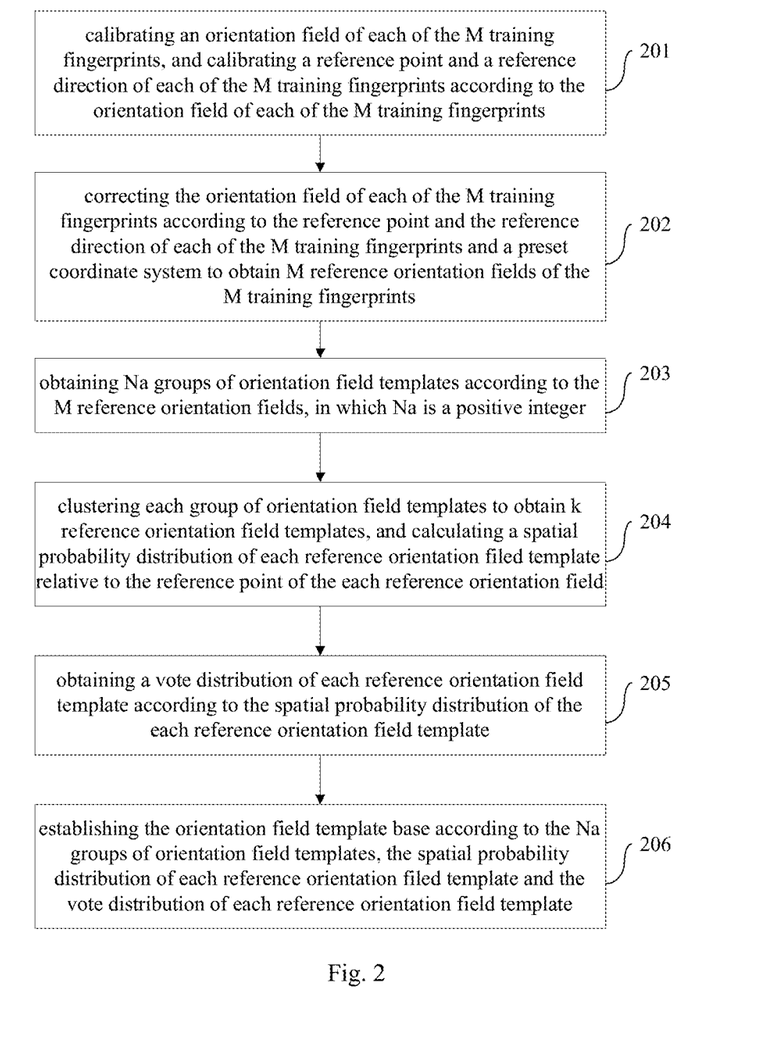
FIG. 2 is a flow chart of establishing an orientation field template base according to an embodiment of the present disclosure.

FIG. 2 is a flow chart of establishing an orientation field template base according to an embodiment of the present disclosure. As shown in FIG. 2, establishing the orientation field template base according to M training fingerprints comprises the following steps.

At step 201, an orientation field of each of the M training fingerprints is calibrated, and a reference point and a reference direction of each of the M training fingerprints is calibrated according to the orientation field of each of the M training fingerprints.

In one embodiment of the present disclosure, in order to ensure that the orientation field template base is most representative and ensure that each orientation field template in the orientation field template base can reflect the real distribution of the fingerprint orientation field, M reference orientation fields may be obtained by manually calibrating the orientation fields of M training fingerprints.

Figure 3:
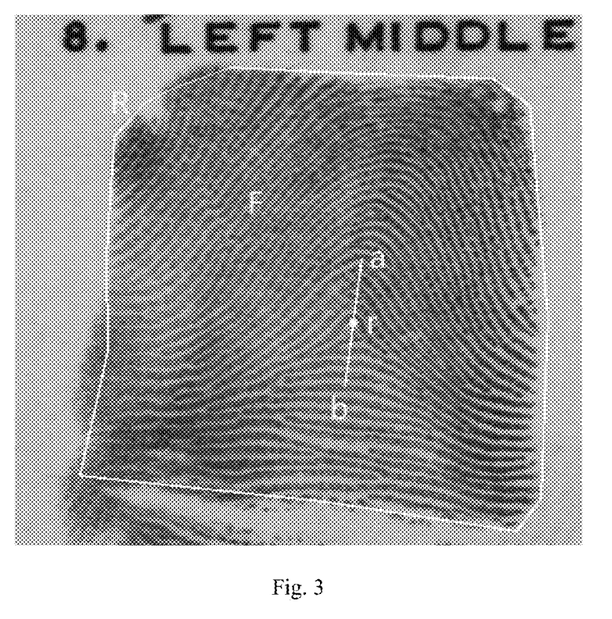
FIG. 3 is a schematic diagram of a reference point and a reference direction of a training fingerprint according to an embodiment of the present disclosure.

FIG. 3 is a schematic diagram of reference point and reference direction of the training fingerprint according to an embodiment of the present disclosure. As shown in FIG. 3, firstly, a valid region R with a high image quality is calibrated mutually. Then, the orientation field corresponding to the fingerprint in the valid region R is calibrated mutually. Finally, the reference point and the reference direction are calibrated. As shown in FIG. 3, the reference point (point r shown in FIG. 3) is the midpoint between point a and point b shown in FIG. 3, and the reference direction is the direction determined by the line connecting point b with point a, in which point a is the vertex of the lowest ridge that extends from left to right in the upper part of the training fingerprint, and point b is the midpoint of the highest ridge in the lower part of the training fingerprint.

At step 202, the orientation field of each of the M training fingerprints is registered according to the reference point and the reference direction of each of the M training fingerprints and a preset coordinate system to obtain M reference orientation fields of the M training fingerprints.

In one embodiment of the present disclosure, the orientation field of each of the M training fingerprints is registered by a rotation, a translation and a direction difference method, such that the reference point of the orientation field of each training fingerprint is located at the origin of the preset coordinate system, and such that the reference direction of the orientation field of each training fingerprints is the positive direction of y axis of the preset coordinate system. The registered orientation field is used as the reference orientation field of the training fingerprint.

Figure 4A:
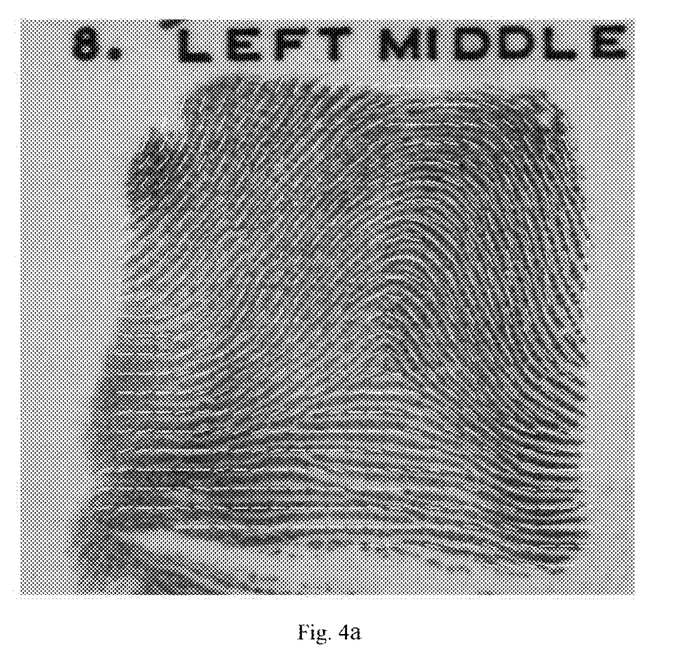
FIG. 4a is a schematic diagram of an orientation field of a training fingerprint before registration according to an embodiment of the present disclosure.
Figure 4B:
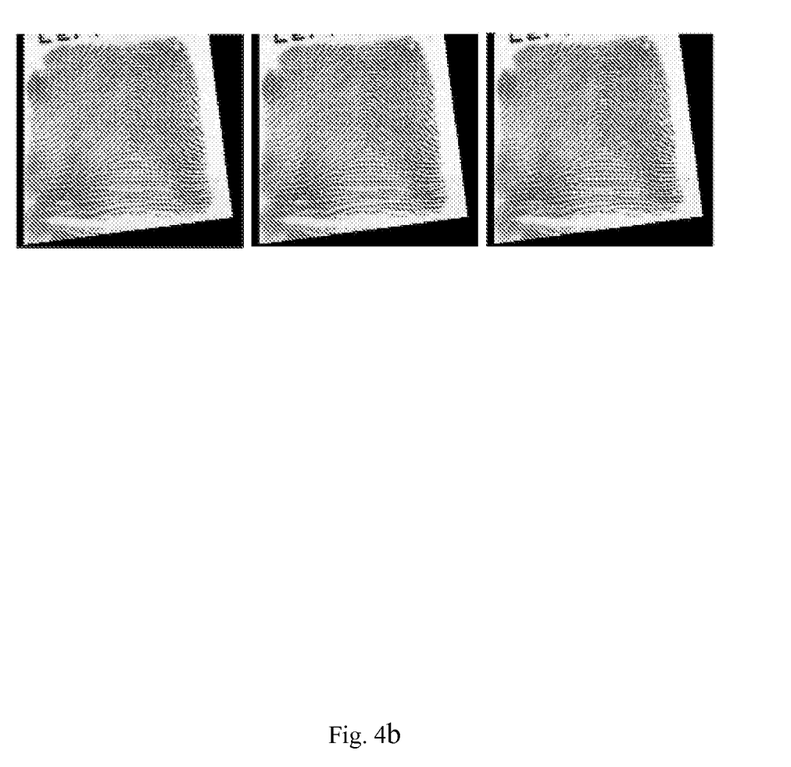
FIG. 4b is a schematic diagram of an orientation field of a training fingerprint after registration according to an embodiment of the present disclosure.

Specifically, the orientation field before registration and the orientation field after registration are shown in FIG. 4, in which FIG. 4*a* is a schematic diagram of the orientation field of the training fingerprint before registration according to an embodiment of the present disclosure, and FIG. 4*b* is a schematic diagram of the orientation field of the training fingerprint after registration according to an embodiment of the present disclosure.

At step 203, Na groups of orientation field templates are obtained according to the M reference orientation fields, in which Na is a positive integer.

Figure 5:
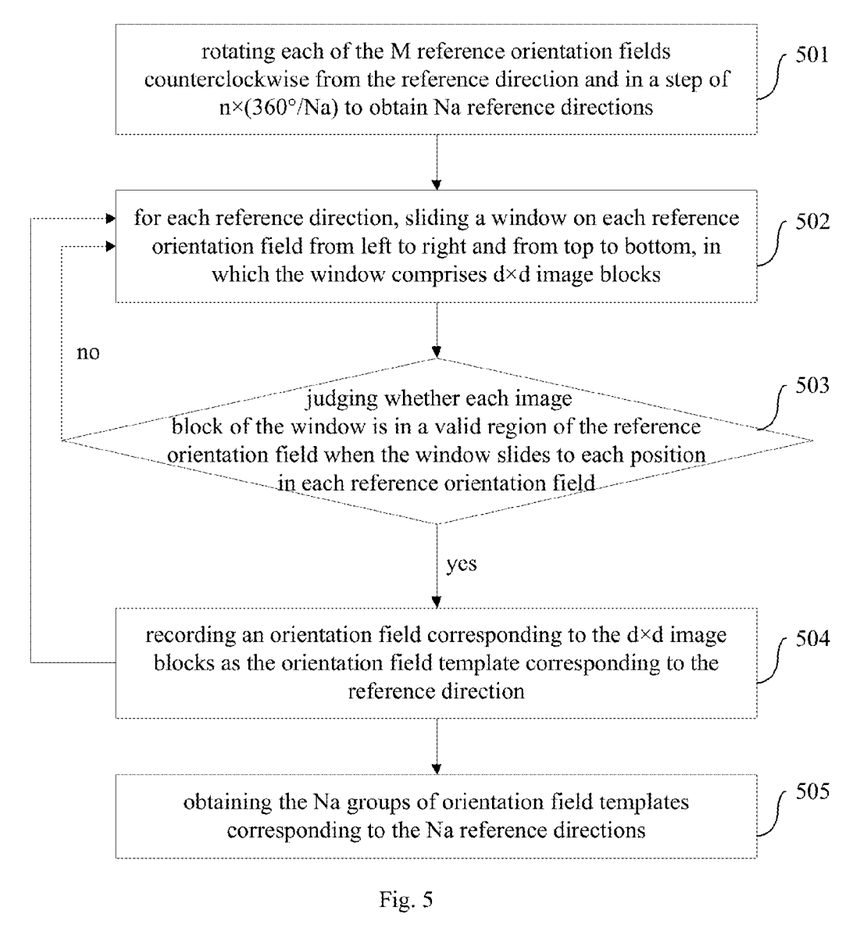
FIG. 5 is a flow chart of obtaining Na groups of orientation field templates according to an embodiment of the present disclosure.

FIG. 5 is a flow chart of obtaining Na groups of orientation field templates according to an embodiment of the present disclosure. As shown in FIG. 5, the step 203 comprises the following steps.

At step 501, each of the M reference orientation fields is rotated counterclockwise from the reference direction and in a step of n×(360°/Na) to obtain Na reference directions, in which $n \in N_a$.

At step 502, for each reference direction, a window slides on each reference orientation field from left to right and from top to bottom, in which the window comprises d×d image blocks, d is a positive integer.

At step 503, it is judged whether each image block of the window is in a valid region of the reference orientation field when the window slides to each position in each reference orientation field, and if yes, execute step 504.

At step 504, an orientation field corresponding to the d X d image blocks is recorded as the orientation field template corresponding to the reference direction.

In one embodiment of the present disclosure, for each orientation field template, the central position (x, y) of the orientation field template and the position $(x_{ref}, y_{ref})$ of the reference point corresponding to the orientation field template are recorded, and then a relative position $(dx_i, dy_i)$ of the central position relative to the position of the reference point is obtained, in which $dx_i=x-x_{ref}, dy_i=y-y_{ref}$.

At step 505, steps 502-504 are repeated until obtaining the Na groups of orientation field templates corresponding to the Na reference directions.

At step 204, each group of orientation field templates is clustered to obtain k reference orientation field templates, and a spatial probability distribution of each reference orientation field template relative to the reference point of the each reference orientation field is calculated.

In one embodiment of the present disclosure, each group of orientation field templates is clustered by a K-medoid clustering method according to the central position of each orientation field template and the relative position of the central position of each orientation field template relative to the position of the reference point of the same orientation field template.

Taking one group of orientation field templates as an example, firstly, k orientation field templates are randomly chosen from the group of orientation field templates as k cluster centers. Then, k reference orientation field templates are obtained by performing the following steps.

At step 1, for each orientation field template in the group of the orientation field templates except for the k orientation field templates, a distance between the orientation field template and each of the k cluster centers is calculated, and the orientation field template is classified into a cluster whose cluster center has a minimum distance away from the orientation field template.

At step 2, for each cluster, each orientation field template in the cluster is chosen as a new cluster center in turn, a distance between the new cluster center and another orientation field template in the cluster is calculated, and a sum of distances between the new cluster center and other orientation field templates in the cluster are calculated. Then, the orientation field corresponding to the minimum sum of distances is chosen as the updated cluster center to substitute the original cluster center.

The above steps 1 and 2 are repeated until the cluster centers do not change any more. Thus, the k reference orientation field templates are determined as the finally obtained k cluster centers.

In one embodiment of the present disclosure, for reference orientation field $k_i$, an empty vote grid having a preset size dx×dy is firstly constituted, in which, $dx \in (-w_d, w_d)$, $dx \in (-_d, h_d)$, ($w_d$ and $h_d$ may be of any size, in this embodiment, the $w_d$ and $h_d$ are set to be 20 image blocks). If the relative position of each orientation field template in the cluster relative to the reference orientation field $k_i$ is located in the vote grid, one vote is obtained at the relative position. Then, the number of votes obtained by the reference orientation field $k_i$ is divided by the number of orientation field templates involving voting (i.e., the number of orientation field templates in the cluster corresponding to the reference orientation field template $k_i$) and then smoothed with a Gaussian mask to obtain the spatial probability distribution of the reference orientation field template $k_i$.

Figure 6:
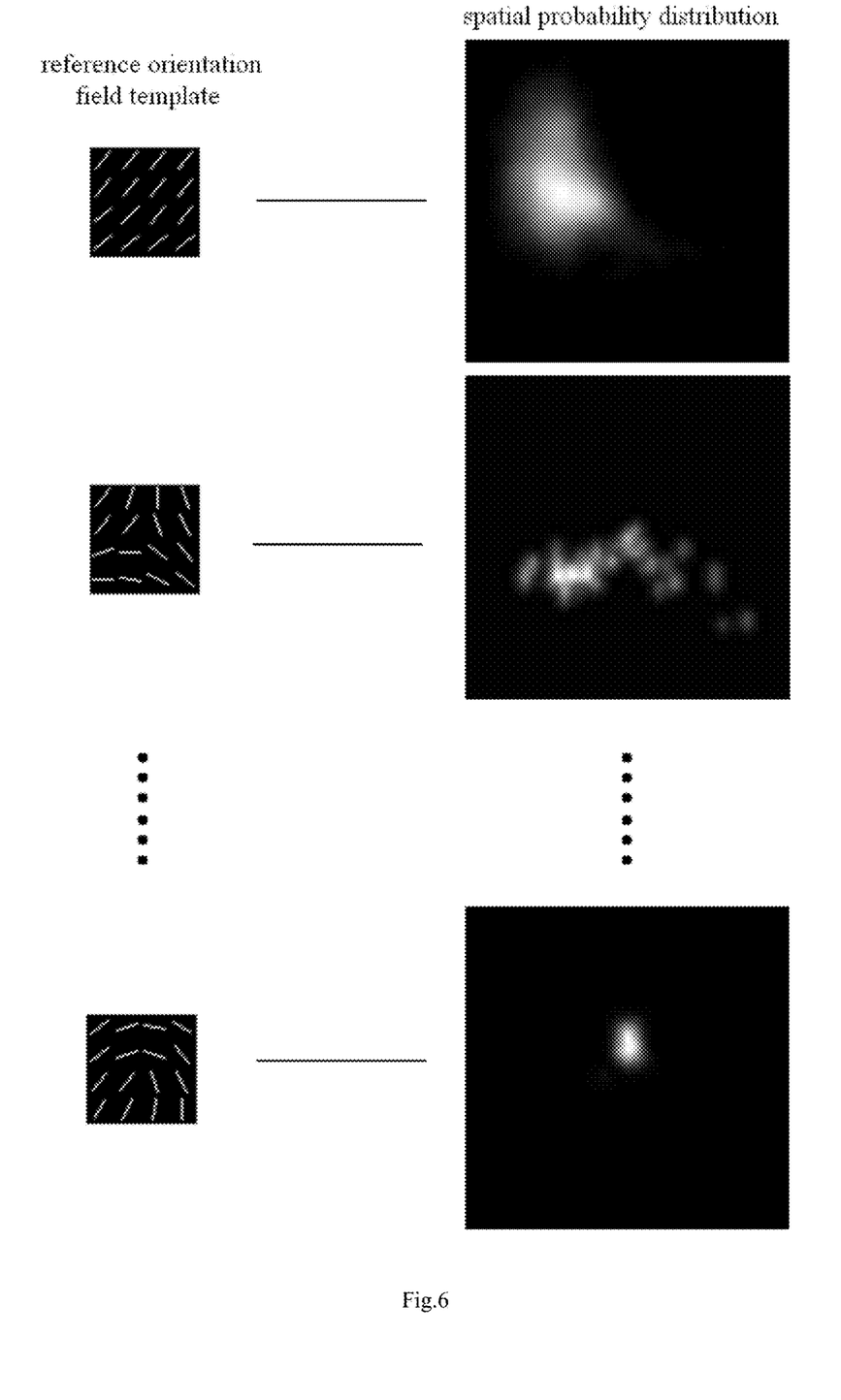
FIG. 6 is a schematic diagram of k reference orientation field templates and k spatial probability distributions corresponding to the k reference orientation field templates according to an embodiment of the present disclosure.

FIG. 6 shows one embodiment of k reference orientation field templates and k spatial probability distributions corresponding to the k reference orientation field templates. As shown in FIG. 6, the reference point of the reference orientation field template is the center of the spatial probability distribution image.

At step 205, a vote distribution of each reference orientation field template is obtained according to the spatial probability distribution of the each reference orientation field template.

Figure 7:
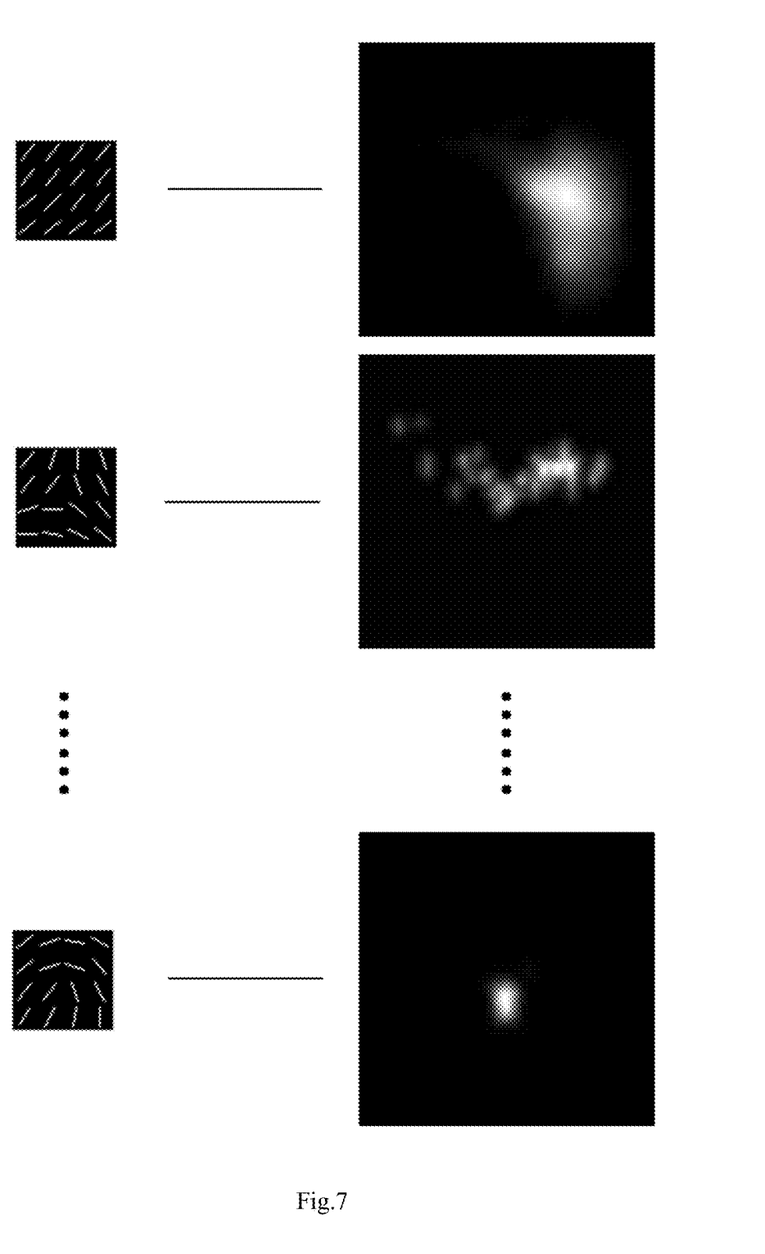
FIG. 7 is a schematic diagram of k reference orientation field templates and k vote distributions corresponding to the k reference orientation field templates according to an embodiment of the present disclosure.

FIG. 7 is a schematic diagram of k reference orientation field templates and k vote distributions corresponding to the k reference orientation field templates according to an embodiment of the present disclosure. In one embodiment of the present disclosure, as shown in FIG. 7, the vote distribution of each reference orientation field template is obtained by mapping the spatial probability distribution of the each reference orientation field template with the reference point of the corresponding reference orientation field as a center.

Therefore, when the reference point and the orientation field template are known, the position and the distribution probability of the orientation field template can be predicted. In turn, when the orientation field template and the position thereof are known, the position and the probability distribution of the reference point can be predicted.

At step 206, the orientation field template base is established according to the Na groups of orientation field templates and the vote distribution of each reference orientation field template.

In other words, the orientation field template base comprises the Na groups of orientation field templates and the vote distribution of each reference orientation field template.

At step 102, a fingerprint image to be registered is received.

At step 103, an initial orientation field of the fingerprint image is obtained.

Figure 8:
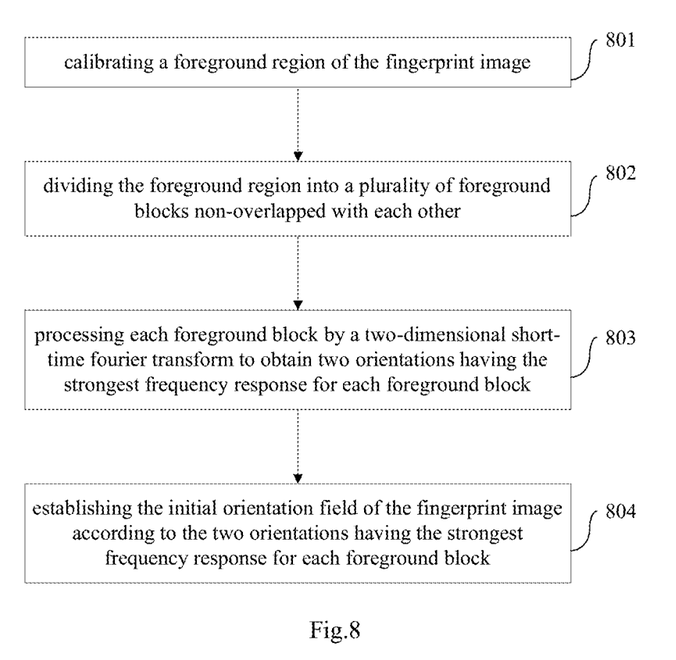
FIG. 8 is a flow chart of obtaining an initial orientation field of the fingerprint image according to an embodiment of the present disclosure.

FIG. 8 is a flow chart of obtaining an initial orientation field of the fingerprint image according to an embodiment of the present disclosure. As shown in FIG. 8, the step 103 comprises the following steps.

At step 801, a foreground region of the fingerprint image is calibrated.

In one embodiment of the present disclosure, the fingerprint image can be collected on the scene or obtained from a fingerprint base. For the fingerprint image collected on the scene, the substantial region where the fingerprint is located in (referred to as the foreground region) is calibrated mutually to remove the background region, thus improving the efficiency of querying the orientation field template base when registering the fingerprint image. For the fingerprint image obtained from the fingerprint base, as the background of the fingerprint image is simple, the foreground region of the fingerprint image can be obtained by using the ratio of the strongest frequency response to the secondary strongest frequency response as the characteristic and comparing the characteristic with a first threshold, without the need of any mutual calibrating.

At step 802, the foreground region is divided into a plurality of foreground blocks non-overlapped with each other.

At step 803, each foreground block is processed by a two-dimensional short-time Fourier transform to obtain two orientations having the strongest frequency response for each foreground block.

In one embodiment of the present disclosure, each foreground block can be regarded as a two dimensional surface wave and can be processed by the two-dimensional short-time Fourier transform. Then, two strongest responses are found in the frequency domain, such that two orientations having the strongest responses are obtained by calculating two angles of the two strongest responses with respect to the frequency domain center.

At step 804, the initial orientation field of the fingerprint image is established according to the two orientations having the strongest frequency response for each foreground block.

In this embodiment of the present disclosure, the orientations having the strongest frequency response of all the foreground blocks constitute the initial orientation field of the fingerprint image.

At step 104, an estimated position and an estimated direction of the fingerprint image are obtained according to the initial orientation field and the orientation field template base.

Figure 9:
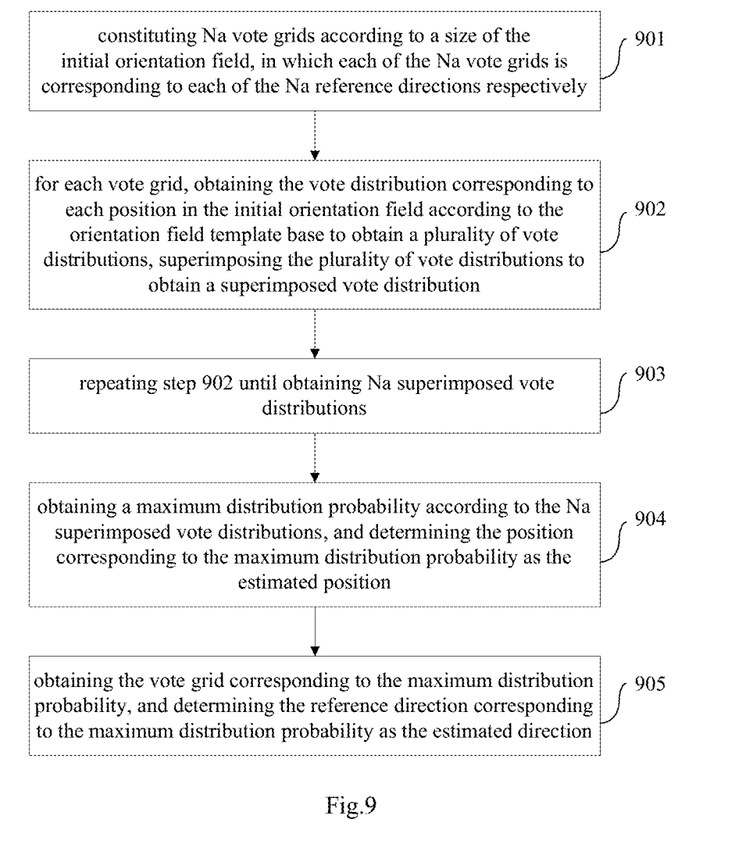
FIG. 9 is a flow chart of obtaining an estimated position and an estimated direction of the fingerprint image according to an embodiment of the present disclosure.

FIG. 9 is a flow chart of obtaining an estimated position and an estimated direction of the fingerprint image according to an embodiment of the present disclosure. As shown in FIG. 9, the step 104 comprises the following steps.

At step 901, Na vote grids are constituted according to a size of the initial orientation field, in which each of the Na vote grids is corresponding to each of the Na reference directions respectively.

At step 902, for each vote grid, the vote distribution corresponding to each position in the initial orientation field is obtained according to the orientation field template base to obtain a plurality of vote distributions, and the plurality of vote distributions are superimposed to obtain a superimposed vote distribution.

Figure 10:
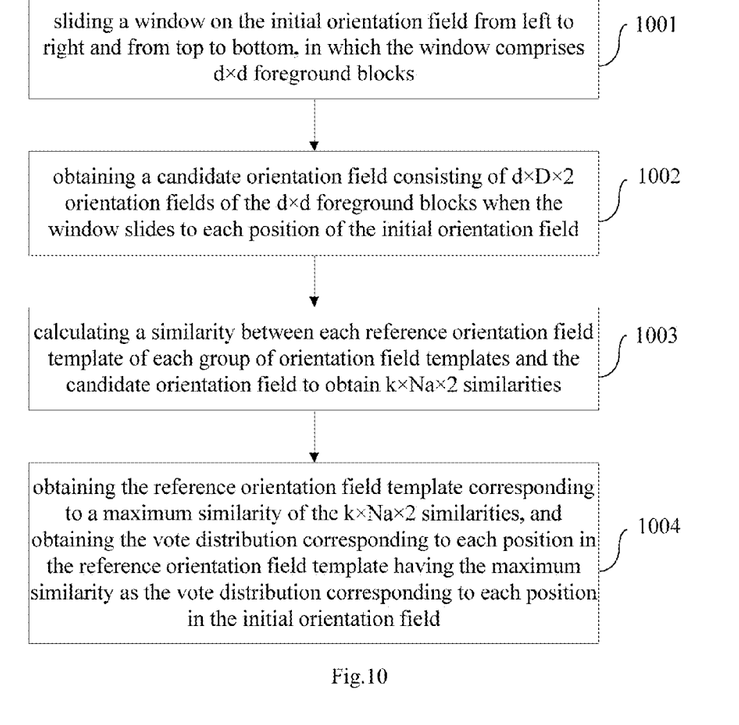
FIG. 10 is a flow chart of obtaining the vote distribution corresponding to each position in the initial orientation field according to an embodiment of the present disclosure.

FIG. 10 is a flow chart of obtaining the vote distribution corresponding to each position in the initial orientation field according to an embodiment of the present disclosure. As shown in FIG. 10, the step 902 comprises the following steps.

At step 1001, a window slides on the initial orientation field from left to right and from top to bottom, in which the window comprises d×d foreground blocks.

At step 1002, a candidate orientation field consisting of d×d×2 orientations of the d×d foreground blocks is obtained when the window slides to each position of the initial orientation field.

At step 1003, a similarity between each reference orientation field template of each group of orientation field templates and the candidate orientation field is calculated to obtain k×Na similarities.

In one embodiment of the present disclosure, for the reference orientation field template ki, the orientation of each image block in the reference orientation field template ki is firstly compared with two orientations of the corresponding foreground block in the candidate orientation field to obtain two orientation differences. If either of the two orientation differences is less than a second threshold (the value of which may be set according to actual requirements and in this embodiment, the second threshold is set to be 10°), the image block matches with the corresponding image block. Thus, the number ns of the foreground blocks that match with the images blocks in the reference orientation field template ki is obtained. Finally, a similarity S between the reference orientation field template ki and the candidate orientation field is calculated according to the formula $S=ns/(d \times d)$. At step 1004, the reference orientation field template corresponding to maximum similarity of the k×Na similarities is obtained, and the vote distribution corresponding to the reference orientation field template corresponding to the maximum similarity is obtained as the vote distribution corresponding to each position in the initial orientation field.

In one embodiment of the present disclosure, the reference orientation field template having the maximum similarity of the k×Na similarities is determined as the orientation field at a certain position. The vote distribution corresponding to the reference orientation field template having the maximum similarity is obtained by querying the orientation field template base and determined as the vote distribution at the certain position.

Thus, a plurality of vote distributions are obtained, and a superimposed vote distribution can be obtained by superimposing the plurality of vote distributions.

Figure 11:
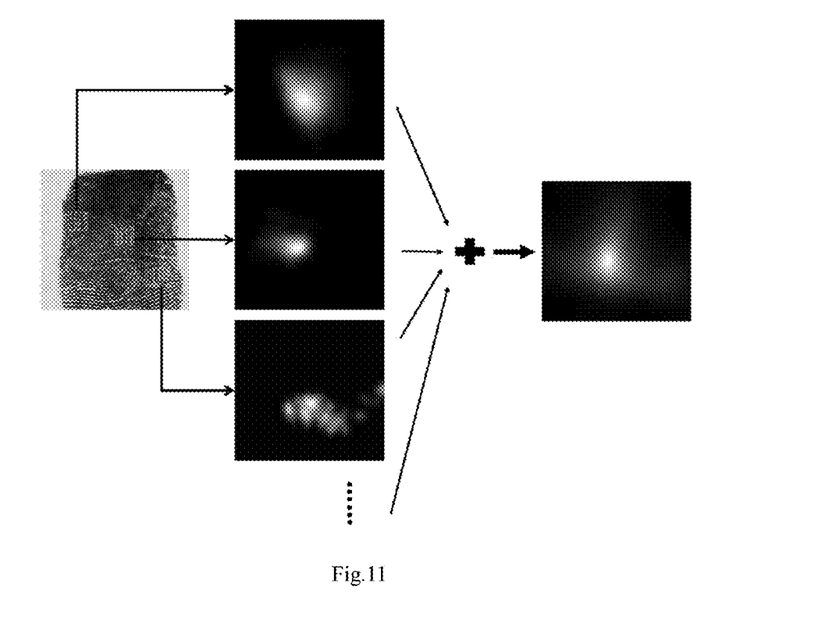
FIG. 11 is a schematic diagram of superimposing vote distributions according to an embodiment of the present disclosure.

FIG. 11 is a schematic diagram of superimposing the plurality of vote distributions according to an embodiment of the present disclosure. As shown in FIG. 11, when n=Na (i.e., the rotation angle is 0 degree), a plurality of vote distributions is obtained according to the vote distribution corresponding to each position in the initial orientation field, and the plurality of vote distributions is superimposed to generate a superimposed vote distribution.

At step 903, step 902 is repeated until obtaining Na superimposed vote distributions.

At step 904, a maximum distribution probability is obtained according to the Na superimposed vote distributions, and the position corresponding to the maximum distribution probability is determined as the estimated position.

After obtaining the plurality of vote distribution corresponding to each position in the initial orientation field respectively, the plurality of vote distributions can be superimposed to the nth vote grid. Then, the distribution probabilities corresponding to each position in the initial orientation field respectively are obtained according to the superimposed distribution probability, and the maximum distribution probability among the distribution probabilities and the position corresponding to the maximum distribution probability are recorded.

At step 905, the vote grid corresponding to the maximum distribution probability is obtained, and the reference direction corresponding to the maximum distribution probability is determined as the estimated direction.

In one embodiment of the present disclosure, the reference direction of the nth vote grid is the direction after rotating n×360°/Na from the reference direction, and the estimated direction of the fingerprint image is determined as the reference direction of the vote grid corresponding to the maximum distribution probability.

At step 105, the fingerprint image is registered according to a preset position, a preset direction, the estimated position and the estimated direction.

In one embodiment of the present disclosure, a translation vector is firstly estimated according to the preset position and the estimated position, and a rotation vector is estimated according to the preset direction and the estimated direction. Then, the fingerprint image is orthogonal transformed according to the translation vector and the rotation vector.

Figure 12:
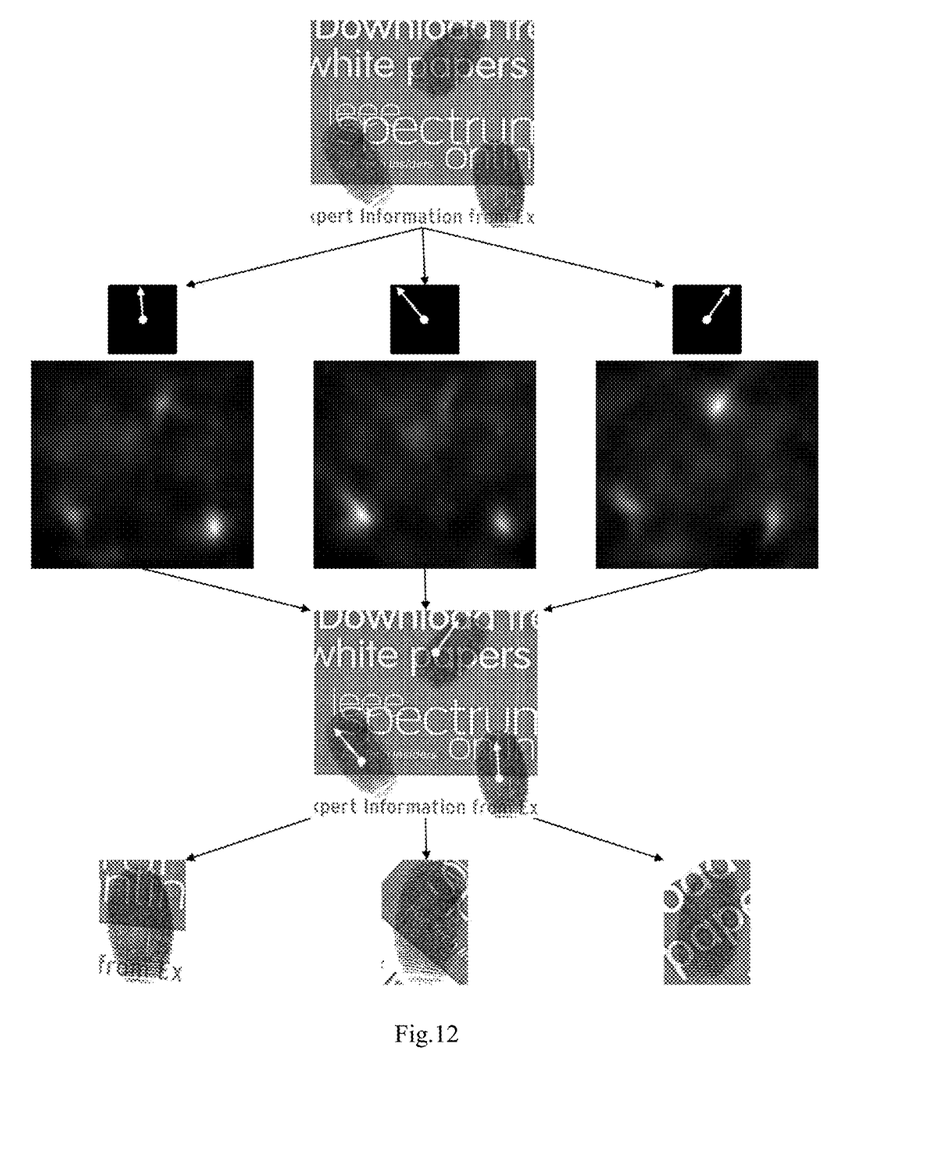
FIG. 12 is a schematic diagram of registering a fingerprint image with three fingerprints having different directions according to an embodiment of the present disclosure.

FIG. 12 is a schematic diagram of registering a fingerprint image with three fingerprints having different directions according to an embodiment of the present disclosure. As shown in FIG. 12, the postures of the fingerprints can be registered effectively.

With the method according to embodiments of the present disclosure, the fingerprint image is registered by using natural characteristics of the fingerprint itself (such as the orientation of the fingerprint ridge and the spatial probability distribution of the orientation) as the prior information, thus reducing the human intervention during the fingerprint detection, reducing the workload of fingerprint identifiers, and improving the efficiency of fingerprint detection and the automation degree of the fingerprint recognition system.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for registering a fingerprint image, comprising steps of:

establishing an orientation field template base according to M training fingerprints, wherein M is a positive integer larger than one;

receiving a fingerprint image to be registered;

obtaining an initial orientation field of the fingerprint image;

obtaining an estimated position and an estimated direction of the fingerprint image according to the initial orientation field and the orientation field template base; and registering the fingerprint image according to a preset position, a preset direction, the estimated position and the estimated direction.

2. The method according to claim 1, wherein establishing an orientation field template base according to M training fingerprints comprises:

calibrating an orientation field of each of the M training fingerprints, and calibrating a reference point and a reference direction of each of the M training fingerprints according to the orientation field of each of the M training fingerprints;

registering the orientation field of each of the M training fingerprints according to the reference point and the reference direction of each of the M training fingerprints and a preset coordinate system to obtain M reference orientation fields of the M training fingerprints;

obtaining Na groups of orientation field templates according to the M reference orientation fields, in which Na is a positive integer;

clustering each group of orientation field templates to obtain k reference orientation field templates, and calculating a spatial probability distribution of each reference orientation field template relative to the reference point of the each reference orientation field;

obtaining a vote distribution of each reference orientation field template according to the spatial probability distribution of the each reference orientation field template; and establishing the orientation field template base according to the Na groups of orientation field templates and the vote distribution of each reference orientation field template.

3. The method according to claim 2, wherein obtaining Na groups of orientation field templates according to the M reference orientation fields comprises:

A1: rotating each of the M reference orientation fields counterclockwise from the reference direction and in a step of $n \times (360°/Na)$ to obtain Na reference directions, in which $n \in N_a$;

A2: for each reference direction, sliding a window on each reference orientation field from left to right and from top to bottom, in which the window comprises d×d image blocks, d is a positive integer;

A3: judging whether each image block of the window is in a valid region of the reference orientation field when the window slides to each position in each reference orientation field;

A4: if yes, recording an orientation field corresponding to the d ×d image blocks as the orientation field template corresponding to the reference direction; and A5: repeating steps A2-A4 until obtaining the Na groups of orientation field templates corresponding to the Na reference directions.

4. The method according to claim 2, wherein each group of the orientation field templates is clustered by a K-medoid clustering method.

5. The method according to claim 2, wherein the vote distribution of each reference orientation field template is obtained by mapping the spatial probability distribution of the each reference orientation field template with the reference point of the corresponding reference orientation field as a center.

6. The method according to claim 1, wherein obtaining an initial orientation field of the fingerprint image comprises:
calibrating a foreground region of the fingerprint image;
dividing the foreground region into a plurality of foreground blocks non-overlapped with each other;
processing each foreground block by a two-dimensional short-time Fourier transform to obtain two orientations having the strongest frequency response for each foreground block; and
establishing the initial orientation field of the fingerprint image according to the two orientations having the strongest frequency response for each foreground block.

7. The method according to claim 3, wherein obtaining an estimated position and an estimated direction of the fingerprint image comprises:
B1: constituting Na vote grids according to a size of the initial orientation field, in which each of the Na vote grids is corresponding to each of the Na reference directions respectively;
B2: for each vote grid, obtaining the vote distribution corresponding to each position in the initial orientation field according to the orientation field template base to obtain a plurality of vote distributions, superimposing the plurality of vote distributions to obtain a superimposed vote distribution;

B3: repeating step B2 until obtaining Na superimposed vote distributions;
B4: obtaining a maximum distribution probability according to the Na superimposed vote distributions, and determining the position corresponding to the maximum distribution probability as the estimated position; and
B5: obtaining the vote grid corresponding to the maximum distribution probability, and determining the reference direction corresponding to the maximum distribution probability as the estimated direction.

8. The method according to claim 7, wherein obtaining the vote distribution corresponding to each position in the initial orientation field according to the orientation field template base comprises:
sliding a window on the initial orientation field from left to right and from top to bottom, in which the window comprises d ×d foreground blocks;
obtaining a candidate orientation field consisting of d×d×2 orientations of the d×d foreground blocks when the window slides to each position of the initial orientation field;
calculating a similarity between each reference orientation field template of each group of orientation field templates and the candidate orientation field to obtain k×Na similarities; and
obtaining the reference orientation field template corresponding to a maximum similarity of the k×Na similarities, and obtaining the vote distribution corresponding to the reference orientation field template having the maximum similarity as the vote distribution corresponding to each position in the initial orientation field.

9. The method according to claim 1, wherein registering the fingerprint image according to a preset position, a preset direction, the estimated position and the estimated direction comprises:
estimating a translation vector according to the preset position and the estimated position;
estimating a rotation vector according to the preset direction and the estimated direction; and
orthogonal transforming the fingerprint image according to the translation vector and the rotation vector.

* * * * *